United States Patent
Ökvist et al.

(10) Patent No.: US 10,691,170 B2
(45) Date of Patent: Jun. 23, 2020

(54) DEVICE FOR HANDHELD OPERATION AND METHOD THEREOF

(71) Applicant: TELEFONAKTIEBOLAGET LM ERICSSON (PUBL), Stockholm (SE)

(72) Inventors: Peter Ökvist, Luleå (SE); Tommy Arngren, Södra Sunderbyn (SE); Till Burkert, Huddinge (SE); David Lindegren, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/557,572

(22) PCT Filed: Mar. 13, 2015

(86) PCT No.: PCT/SE2015/050283
§ 371 (c)(1),
(2) Date: Sep. 12, 2017

(87) PCT Pub. No.: WO2016/148610
PCT Pub. Date: Sep. 22, 2016

(65) Prior Publication Data
US 2018/0052492 A1 Feb. 22, 2018

(51) Int. Cl.
*G06F 1/16* (2006.01)
*G06F 3/0488* (2013.01)
(Continued)

(52) U.S. Cl.
CPC .......... *G06F 1/1643* (2013.01); *G06F 1/1694* (2013.01); *G06F 3/0412* (2013.01);
(Continued)

(58) Field of Classification Search
CPC .... G06F 1/1643; G06F 1/1694; G06F 3/0412; G06F 3/04842; G06F 3/0485; G06F 3/0488
See application file for complete search history.

(56) References Cited

U.S. PATENT DOCUMENTS

| 7,747,749 B1 | 6/2010 | Erikson et al. |
| 8,732,569 B2 | 5/2014 | Burkard et al. |

(Continued)

FOREIGN PATENT DOCUMENTS

| CA | 2 833 034 A1 | 10/2012 |
| JP | 2009-265929 A | 11/2009 |

(Continued)

OTHER PUBLICATIONS

Canadian Office Action issued in Application No. 2979658 dated Jul. 5, 2018, 6 pages.
(Continued)

*Primary Examiner* — Sejoon Ahn
(74) *Attorney, Agent, or Firm* — Rothwell, Figg, Ernst & Manbeck, P.C.

(57) ABSTRACT

A device (100) for handheld operation is provided. The device comprises a touchscreen (110) and processing means (111) operative to display a plurality of user-interface (UI) elements (121-124) on the touchscreen, wherein each UI element is associated with an action which is performed in response to touching the UI element, determine one or more of the displayed UI elements which a user (150, 151) of the device is likely to touch based on a touch pattern (130), and perform, for at least one of the determined UI elements, the action associated with the UI element. The action may, e.g., comprise pre-fetching content which is likely to be requested by the user from a server (180). Performing an action, such as pre-fetching, based on a touch pattern is advantageous since a touch pattern reflects the relative
(Continued)

likelihood that the user touches a specific position, or region, of the touchscreen, thereby reducing latency.

22 Claims, 5 Drawing Sheets

(51) Int. Cl.
*G06F 3/0485* (2013.01)
*G06F 3/0484* (2013.01)
*G06F 16/957* (2019.01)
*G06F 3/041* (2006.01)

(52) U.S. Cl.
CPC .......... *G06F 3/0485* (2013.01); *G06F 3/0488* (2013.01); *G06F 3/04842* (2013.01); *G06F 16/957* (2019.01)

(56) References Cited

U.S. PATENT DOCUMENTS

| | | | | |
|---|---|---|---|---|
| 2006/0111093 A1* | 5/2006 | Shim | ............... | G06F 1/1626 |
| | | | | 455/418 |
| 2009/0109183 A1* | 4/2009 | Carvajal | ............... | G06F 3/0416 |
| | | | | 345/173 |
| 2009/0271723 A1* | 10/2009 | Matsushima | ......... | G06F 3/0482 |
| | | | | 715/769 |
| 2011/0057907 A1* | 3/2011 | Kim | ............... | G06F 3/042 |
| | | | | 345/175 |
| 2011/0070895 A1* | 3/2011 | Ichinose | ............ | H04M 1/2745 |
| | | | | 455/456.1 |
| 2012/0068945 A1* | 3/2012 | Sugeda | ................ | G01C 21/367 |
| | | | | 345/173 |
| 2012/0169646 A1 | 7/2012 | Berkes et al. | | |
| 2012/0265978 A1* | 10/2012 | Shenfield | ................ | G06F 9/451 |
| | | | | 713/100 |
| 2013/0076645 A1 | 3/2013 | Anantha et al. | | |
| 2013/0162528 A1* | 6/2013 | Penttila | ................. | G09G 5/08 |
| | | | | 345/157 |
| 2013/0222286 A1* | 8/2013 | Kang | ................ | G06F 3/041 |
| | | | | 345/173 |
| 2013/0226837 A1* | 8/2013 | Lymberopoulos | .......................... | |
| | | | | G06F 16/9574 |
| | | | | 706/12 |
| 2013/0257761 A1 | 10/2013 | Karlsson | | |
| 2014/0022285 A1* | 1/2014 | Stovicek | ................ | G06F 1/1694 |
| | | | | 345/650 |
| 2014/0149935 A1* | 5/2014 | Johnson | ................ | G06F 3/0482 |
| | | | | 715/811 |
| 2015/0205507 A1* | 7/2015 | Chen | ................... | G06F 3/04883 |
| | | | | 715/800 |
| 2016/0147421 A1* | 5/2016 | Whalin | ............... | G06F 3/04842 |
| | | | | 715/753 |

FOREIGN PATENT DOCUMENTS

| | | |
|---|---|---|
| KR | 10-2014-0046905 A | 4/2014 |
| WO | 2014129756 A1 | 8/2014 |

OTHER PUBLICATIONS

Translation of Korean Office Action, issued in corresponding Korean Patent Application No. 10-2017-7029475, dated Mar. 1, 2019, 5 pages.
European Communication pursuant to Article 94(3) EPC dated Apr. 3, 2019 issued in European Application No. 15 719 868.0 (5 pages).
International Search Report and Written Opinion issued in Application No. PCT/SE2015/050283 dated Jun. 24, 2015, 11 pages.
International Preliminary Report on Patentability issued in Application No. PCT/SE2015/050283 dated Jul. 10, 2017, 16 pages.
Yoo, Juwan et al: "Air Hook: Data Preloading User Interface", School of Integrated Technology, Yonsei University, Korea, IEEE, 2012, 5 pages.
Appsee, "Touch Heatmaps" www.appsee.com/features/touch-heatmaps, Mar. 12, 2015, 3 pages.
Canadian Office Action issued in Canadian Application No. 2,979,658, dated Jun. 20, 2019, 4 pages.
First Office Action dated Jan. 16, 2020 issued in Chinese Patent Application No. 201580077783.6. (4 pages).

* cited by examiner

DEVICE FOR HANDHELD OPERATION AND METHOD THEREOF

CROSS REFERENCE TO RELATED APPLICATION(S)

This application is a 35 U.S.C. § 371 National Stage of International Patent Application No. PCT/SE2015/050283, filed Mar. 13, 2015, designating the United States, the disclosure of which is incorporated by reference.

TECHNICAL FIELD

The invention relates to a device for handheld operation, a method of a device for handheld operation, a corresponding computer program, and a corresponding computer program product.

BACKGROUND

Using the web or other services requiring transmission of data to mobile devices, such as mobile terminals, mobile phones, smartphones, or tablets, can be a mixed experience. Long response times when retrieving web pages or other content provided by servers may result in bad user experience and dissatisfaction. The latency related to retrieving data over wireless communications networks through which mobile devices connect to the Internet can be improved by pre-fetching content.

Pre-fetching content such as web pages is based on predicting content which is likely to be requested by the user of a mobile device before the user actually requests the content, e.g., by selecting a link on a web page which is rendered on the mobile device. Known strategies for predicting content for pre-fetching are frequently based on statistics for requested content. In addition, user-specific behavior, such as browser history, may be taken into account. Pre-fetching may also be based on the geographic location of a mobile device, since users are more likely to read local news articles than articles relating to remote locations.

SUMMARY

It is an object of the invention to provide an improved alternative to the above techniques and prior art.

More specifically, it is an object of the invention to provide solutions for reducing latency of devices being operated by means of a touchscreen-based user-interface, in particular when accessing content provided over a communications network accessible by the device.

These and other objects of the invention are achieved by means of different aspects of the invention, as defined by the independent claims. Embodiments of the invention are characterized by the dependent claims.

According to a first aspect of the invention, a device for handheld operation is provided. The device comprises a touchscreen and processing means. The processing means is operative to display a plurality of user-interface (UI) elements on the touchscreen. Each of the displayed UI elements is associated with an action which is performed in response to touching the UI element. The processing means is further operative to determine one or more of the displayed UI elements which a user of the device is likely to touch. The one or more of the displayed UI elements which a user of the device is likely to touch are determined based on a touch pattern. The processing means is further operative to perform, for at least one of the one or more UI elements which the user of the device is likely to touch, the action associated with the UI element.

According to a second aspect of the invention, a method of a device for handheld operation is provided. The device comprises a touchscreen. The method comprises displaying a plurality of UI elements on the touchscreen. Each of the displayed UI elements is associated with an action which is performed in response to touching the UI element. The method further comprises determining one or more of the displayed UI elements which a user of the device is likely to touch. The one or more of the displayed UI elements which a user of the device is likely to touch are determined based on a touch pattern. The method further comprises performing, for at least one of the one or more UI elements which the user of the device is likely to touch, the action associated with the UI element.

According to a third aspect of the invention, a computer program is provided. The computer program comprises computer-executable instructions for causing the device to perform the method according to an embodiment of the second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

For the purpose of elucidating the invention, a device for handheld operation is to be understood as a device which is designed to be held and operated by a hand or the hands of a user of the device. Embodiments of the invention are directed towards devices providing a touchscreen-based user interface enabling the user to operate the device by touching, and/or performing gestures, with one or more fingers. In the present context, a device for handheld operation may, e.g., be a mobile terminal, a mobile device, a mobile phone, a smartphone, a User Equipment (UE), or a tablet. Depending on the geometry of the device, it may be operable by one hand, referred to as single-handed operation, i.e., the device is held with one hand and a finger of the same hand, typically the thumb, interacts with the touchscreen. This is typically the case for devices having the size of a smartphone, such as the Apple iPhone or the Samsung Galaxy. Devices having a larger size, such as the Apple iPad or the Samsung Tab, are typically held with one hand while the other hand is interacting with the touchscreen. Note that, depending on the geometry of the device and the anatomy of a user's hands, devices may be operated single-handedly or with both hands. A UI element is a graphical object which the user can touch to control the device, such as a virtual button or key, a link, or an icon, as is known from touchscreen-based user-interfaces provided by Apple's iOS, Android, Symbian, Windows Mobile, and the like.

The invention makes use of an understanding that the touch pattern of a touchscreen-based device may be used for performing, initiating, or preparing, an action which is associated with a UI element displayed on the touchscreen dependent on the position of the UI element in relation to the touch pattern, before the action is actually requested by the user. The touch pattern reflects the relative likelihood that the user touches a specific position, or region, of the touchscreen. Accordingly, the performed action is the action which is associated with the UI element which, according to the touch pattern, is most likely to be touched by the user. Optionally, a plurality of UI elements which are likely to be touched may be determined and their associated actions performed. In the art, touch patterns are used for analyzing and visualizing user interaction with web pages or user interfaces, and are also referred to as touch heatmaps.

Performing an action, such as pre-fetching content from a server or pre-loading a piece of software, based on touch patterns is advantageous since touch patterns of users operating touchscreen-based devices do not exhibit an even distribution of touch probability over the entire area of the touchscreen. Rather, different positions on or regions of the touchscreen have different relative probabilities of being touched by a finger of the user. This is the case since the touch pattern reflects the geometry of the device, the anatomy of the user's hand, the way the user holds and operates the device, such as single-handedly or with both hands, as well as the user's touch habits. In particular for single-handed operation, the touch pattern is noticeably influenced by the limited region of the touchscreen which is accessible by the tip of the thumb of the hand holding the device.

By performing an action associated with a UI element based on a touch pattern before the user actually has requested the action, latency is reduced and users experience a swifter response of the device. When determining the one or more of the displayed UI elements which a user of the device is likely to touch, the one or more UI elements which have the highest probability to be touched are selected. The probability of touch is determined for each UI element by looking up the UI element's position on the touchscreen on the touch pattern. The one or more UI elements which have the highest probability to be touched may be the most likely UI element only, the top-two or top-three most likely UI elements, or any other number of most likely UI elements. Alternatively, embodiments of the invention may initially perform the action which is associated with the most likely UI element, and subsequently perform actions in accordance with decreasing touch-probability until the user touches the screen to actually request an action.

According to an embodiment of the invention, the touch pattern is user specific. This is advantageous since user-specific touch habits are taken into consideration for predicting the most likely UI element or elements. Moreover, for single-handed operation, the touch pattern is at least in part determined by the anatomy of the user's hand. Alternatively, touch patterns may be generic touch patterns which are derived by averaging touch patterns of a group of users.

According to an embodiment of the invention, the touch pattern is dependent on the displayed UI elements, in particular their arrangement on the touchscreen. Typically, the touch pattern of a single-columned list of UI elements is different from a touch pattern for UI elements which are arranged in a grid. Advantageously, using touch patterns which are dependent on the displayed UI elements results in a more reliable prediction of the most likely UI element or elements.

According to an embodiment of the invention, the action comprises requesting content provided by a server via a communications network which the device is operative to access. The communications network may be wired or wireless, or a combination thereof, such as an Ethernet network, a Local Area Network (LAN), a Wireless LAN (WLAN) or Wi-Fi network, the Internet, or a cellular mobile network. The content may, e.g., be identified by a network address associated with the UI element, such as a Uniform Resource Locator (URL). Optionally, the device may further be operative to detect that the user touches one of the one or more UI elements which the user of the device is likely to touch, and render the requested content which is associated with the touched UI element. By pre-fetching content which the user is likely to request, data which is required for starting rendering the content may be retrieved by the device, e.g., downloaded or streamed, before the user actually requests the content. In that way, latency for rendering requested content is reduced. The requested content is, if successfully retrieved by the time the user touches the associated UI element, rendered. If the touched UI element is not among the UI elements which were determined as likely, the device requests the content which is associated with the touched UI element, and the pre-fetched content may be discarded.

According to an embodiment of the invention, the action comprises loading computer-executable instructions stored in a first memory of the device into a second memory of the device, wherein the second memory has a shorter access time than the first memory. The second memory may, e.g., comprise a cache memory which is typically comprised in a processor of the device. Optionally, the device may further be operative to detect that the user touches one of the one or more UI elements which the user of the device is likely to touch, and execute the loaded computer-executable instructions which are associated with the touched UI element. By pre-loading a set of instructions, i.e., a piece of software, the time required to execute the software, either an application or app, or a specific functionality of an application or app, when requested by the user is reduced, and the user experiences the device's operation as being swifter. If the touched UI element is not among the UI elements which were determined as likely, the device loads the computer-executable instructions which are associated with the touched UI element.

According to an embodiment of the invention, the processing means may further be operative to detect that the user touches one of the displayed UI elements, and update the touch pattern based on a position of the touched UI element on the touchscreen. By updating the touch pattern in response to detecting a touch, the touch pattern of the device is improved and becomes more user-specific over time, resulting in an improved prediction of UI elements which are likely to be touched.

According to an embodiment of the invention, the processing means may be operative to determine the one or more UI elements which the user of the device is likely to touch in response to detecting that an ongoing scrolling motion is about to stop. For instance, the processing means may be operative to detect that the user has released the displayed graphical object, e.g., a web page, which she has scrolled, letting the scrolled object slow down, or that the user has stopped an ongoing scrolling motion by touching the touchscreen to stop the scrolling object. Optionally, the processing means may be operative to determine the one or more UI elements which the user of the device is likely to touch based on respective positions where the displayed UI elements come to rest when the scrolling motion has stopped. Advantageously, by detecting that an ongoing scrolling motion is about to stop, and determining the respective positions of UI elements which are visible on the touchscreen when the scrolling motion has stopped, an improved prediction of the UI elements which are most likely to be touched is achieved. This is based on an understanding that users of touchscreen-based devices develop a feeling for when to stop or slow down an ongoing scrolling motion such that a desired UI element, i.e., a UI element which the user intends to touch, will come to rest at a position which is comfortably accessible by a user's finger, in particular the user's thumb during single-handedly operation.

According to an embodiment of the invention, the processing means may be operative to determine the one or more UI elements which the user of the device is likely to touch in response to detecting a characteristic motion of the device, a characteristic change in orientation of the device, or both. This is a motion and/or change in orientation which the device associates with the user extending her thumb to reach regions of the touchscreen which are more difficult to access, thereby effectively modifying the touch pattern. Optionally, the touch pattern may further be dependent on the characteristic motion and/or the characteristic change in orientation. Advantageously, by using the characteristic motion and/or the characteristic change in orientation as a trigger for predicting the most likely UI element or elements, and using the characteristic motion and/or the characteristic change in orientation as additional input to the prediction, a more accurate prediction can be made.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
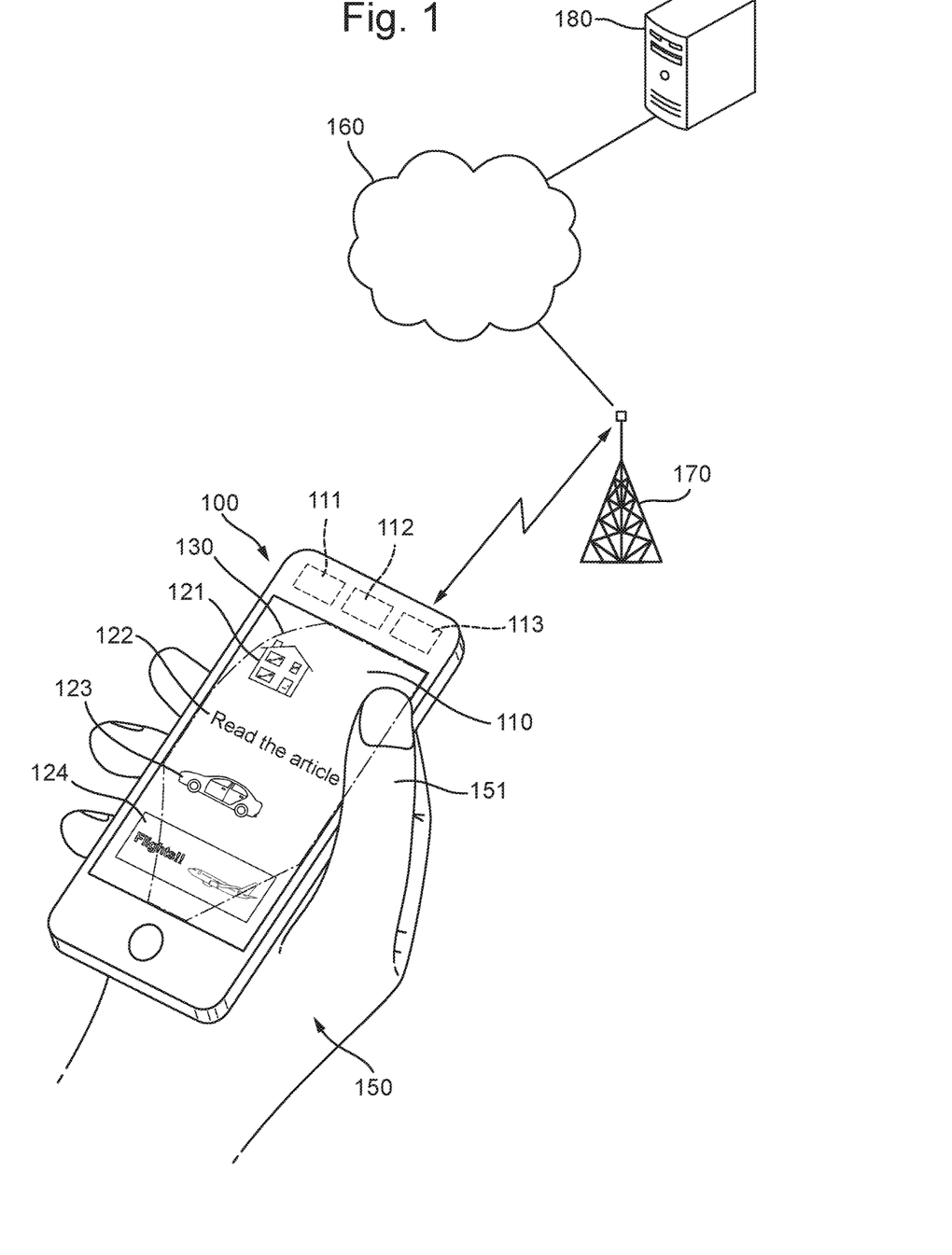
FIG. 1 shows a device for handheld operation, in accordance with an embodiment of the invention.

In FIG. 1, an embodiment 100 of a device for handheld operation is shown. Device 100 comprises a touchscreen 110 and processing means 111. Optionally, device 100 may further comprise means 113 for communicating with a communications network 160, such as the Internet, a Local Area Network (LAN), a corporate network, or the like. Means 133 may, e.g., be a radio unit comprising a radio transceiver being operative for effecting wireless communications with a Radio Access Network (RAN) 170, such as a WLAN or Wi-Fi network, or a cellular communications network, such as a Global System for Mobile Communications (GSM) network, a Universal Mobile Telecommunications System (UMTS) network, or a Long Term Evolution (LTE) network. It will be appreciated by those skilled in the art that embodiments of the invention are not limited to wireless communications. Accordingly, means 113 may be wired network interface enabling device 100 to communicate with communications network 160 over a wired communication link, such as Ethernet (not shown in FIG. 1). Device 100 may, e.g., be a mobile terminal, a mobile phone, a UE, or a smartphone.

Touchscreen 110 is operative for providing a touchscreen-based user interface, enabling the user to operate device 100 by touching, and/or performing gestures, with one or more fingers 151, as is known from Apple's iOS, Android, Symbian, Windows Mobile, and other operating systems supporting touchscreen-based user interfaces. Various types of touchscreen are known, such as resistive touchscreens, surface acoustic wave touchscreens, and capacitive touchscreens.

Processing means 111 is operative to display a plurality of user-interface (UI) elements 121-124 on touchscreen 110. UI elements 121-124 are graphical objects which the user can touch to control device 100 or enter information. A UI element 121-124, may, e.g., be a virtual button or key, a link 122, an icon 121 or 123, or an image 124. Each of UI elements 121-124 is associated with an action which is performed in response to touching the UI element. It will be appreciated that processing means 111 may be operative to display additional UI elements on touchscreen 110 which are not associated with any action, such as text, images, or other graphical objects. Such additional UI elements cannot be used to control the operation of device 100.

Processing means 111 is further operative to determine, based on a touch pattern, one or more of the displayed UI elements 121-124 which a user of the device is likely to touch, herein also referred to as likely UI elements. Preferably, these are the one or more UI elements which have the highest probability to be touched by the user of device 100. The probability of touch is determined for each UI element by looking up the UI element's position on the touchscreen on the touch pattern. The touch pattern reflects the relative probability that the user touches a specific position on, or region of, touchscreen 110. The touch pattern may be stored in a data storage of device 100, e.g., a memory 430 comprised in processing means 111 (see FIG. 4, described further below), or in a data storage which is accessible to device 100 over communications network 160 which device 100 is operative to access, such as a Networked Attached Storage (NAS) or cloud storage. Such touch patterns, in the art also known as heatmaps, are described in further detail below, with reference to FIG. 3. They reflect the geometry of device 100, the anatomy of the user's hand 150, the way the user holds and operates device 100, such as single-handedly or with both hands, as well as touch habits of the user. In particular for single-handed operation, the touch pattern is noticeably influenced by the limited region 130 of touchscreen 110 which is accessible by the tip of thumb 151 when holding device 100 with hand 150.

Processing means 111 is further operative to perform, for at least one of the one or more UI elements which the user of device 100 is likely to touch, the action associated with the UI element. To this end, the performed action is the action which is associated with the UI element which, according to the touch pattern, is most likely to be touched by the user. Optionally, a plurality of UI elements which are likely to be touched may be determined and their associated actions performed. As an alternative, processing means 111 may be operative to initially perform the action which is associated with the most likely UI element, and subsequently perform the action or actions which are associated with other likely UI elements, in accordance with decreasing probability of being touched by the user.

For instance, a link 122 may, e.g., be associated with the action of requesting content provided by a server 180, such as a web page, a video, or an application or app. The content may be identified by a network address, such as a URL, pointing to a web server 180, media server 180, or the like, which is accessible via communications network 160.

To this end, device 100 pre-fetches content, by requesting and retrieving data, which the user is likely to request by touching link 122. Processing means 111 may further be operative to detect that the user touches one of the one or more UI elements which were determined to be likely to be touched by the user of device 100, and render the requested content which is associated with the touched UI element. That is, the requested content is, if successfully retrieved by the time the user touches the associated UI element, displayed or rendered on device 100. For instance, a requested web page may be rendered by a web browser which is executed on device 100, and a requested video may be rendered by a video player which is executed on device 100. If only a part of the content has been retrieved by the time the user touches the associated UI element, and depending on the type of content which is requested, processing means 111 may start rendering the content while the remaining part is retrieved. Further, if the touched UI element is not among the UI elements which were determined as likely, device 100 requests the content which is associated with the touched UI element, and the pre-fetched content may be discarded.

As a further example, an icon 121 or 123 may be associated with the action of loading computer-executable instructions stored in a first memory of device 100 into a second memory of device 100, wherein the second memory has a shorter access time than the first memory. For instance, the computer-executable instructions, i.e., a piece of software or part of a software or computer program, application, or app, may be loaded from a main memory 430, such as a Random Access Memory (RAM), into a cache memory 421 comprised in a processor 420 of processing means 111 (shown in FIG. 4 described further below). Typically, such a cache memory is provided in close proximity to, and is often contained in the same Integrated Circuit (IC) as, the processor executing the instructions, resulting in a shorter access time as compared to other types of data storage, such as the main memory, hard disk drives, NAS, or cloud storage. By pre-loading the instructions, latency is reduced and the user experiences operation of device 100 as being swifter once she touches the icon which is associated with the pre-loaded instructions. Processing means 111 may further be operative to detect that the user touches one of the one or more UI elements which were determined to be likely to be touched by the user of device 100, and execute the computer-executable instructions which were pre-loaded into the second memory, e.g., cache memory 421. If the touched UI element is not among the UI elements which were determined as likely, processing means 111 loads the computer-executable instructions which are associated with the touched UI element into the second memory, and the pre-loaded instructions may be discarded or overwritten.

Further with reference to FIG. 1, processing means 111 may be further operative to detect that the user touches one of the displayed UI elements 121-124, and update the touch pattern based on a position of the touched UI element. That is, device 100 may continuously, occasionally, or during a training phase, learn the touch habits of the user by updating the touch pattern based on actual interactions by the user with device 100, i.e., the user touching touchscreen 110. This is advantageous in that prediction of the UI element or elements which the user is most likely to touch becomes more accurate. As an alternative, processing means 111 may be operative to update the touch pattern based on a position of the user interaction, i.e., where finger 151 of hand 150 touches touchscreen 110, and information indicating whether the prediction, i.e., determining one or more of the displayed UI elements 121-124 which the user is likely to touch, has been successful or not. As yet a further embodiment, instead of using user specific touch patterns, embodiments of device 100 may utilize generic touch patterns, or touch patterns which are derived by averaging touch interactions of a group of users.

Even further with reference to FIG. 1, processing means 111 may be operative to determine the one or more UI elements which the user of device 100 is likely to touch in response to detecting that an ongoing scrolling motion is about to stop. For instance, processing means 111 may be operative to detect that the user of device 100 has released a displayed graphical object, e.g., a web page, which she has scrolled, letting the scrolled object slow down until it comes to rest. Alternatively, processing means 111 may be operative to detect that the user of device 100 has stopped an ongoing scrolling motion by touching the touchscreen to stop the scrolling object.

Optionally, processing means 111 may be operative to start a timer in response to detecting that an ongoing scrolling motion is about to stop, and perform the associated action or actions after the timer has lapsed. In other words, rather than determining one or more of the displayed UI elements 121-124 which the user is likely to touch, and subsequently performing the action or actions which is/are associated with the one or more likely UI elements, immediately after detecting that an ongoing scrolling motion is about to stop, processing means 111 is operative to delay performing the associated action or actions so as to avoid performing actions in vein in situations where the user continuous scrolling after a short duration of time. This may, e.g., be the case if the user lifts finger 151 used for scrolling a graphical object once finger 151 has reached the circumference of touchscreen 110, e.g., the upper or lower end of touchscreen 110, necessitating to move the tip of finger 151 away from the circumference in order to proceed scrolling. The duration of the timer may either be configurable by the user of device 100, or preset to a fixed value. It will be appreciated that the optimal duration of the timer is dependent on user habits, in particular on how fast the user moves her finger 151 when scrolling. Typically, the duration of the timer is on the order of a few tens of milliseconds to a few hundreds of milliseconds. One may also envisage embodiments of the invention which are operative to learn the optimal value of the timer during operation of device 100 by the user. More specifically, processing means 111 may be operative to measure, either continuously, occasionally, or during a training phase, the duration of time between detecting that an ongoing scrolling motion is about to stop and the user touching touchscreen 110 to either continue scrolling or touching a UI element in order to initiate an action such as pre-fetching or pre-loading. Based on a data set of measured durations, processing means 111 may be operative to select an optimal duration for the timer such that performing an associated action in situations where the user continues scrolling is avoided, at least to certain extent. For instance, if the measured durations exhibit a bimodal distribution, such that a mode of shorter durations can be associated with the user touching touchscreen 110 to continue scrolling, and a second mode of longer durations can be associated with the user touching a displayed UI element 121-124 on touchscreen 110, the optimal timer duration is a value in-between the two modes.

Preferably, processing means 111 may be operative to determine the one or more UI elements which the user of the device is likely to touch based on respective positions where the displayed UI elements come to rest when the scrolling motion has stopped. This relates to the situation when the user scrolls a graphical object, such as a web page, a text, or a collection of images, which are larger than touchscreen 110 when displayed. In such cases, only a portion of the graphical object is visible on touchscreen 110, e.g., a part of a newspaper web page presenting short summaries with links to in-depth articles. Users of touchscreen-based devices, such as device 100, develop a feeling for when to release a scrolled object such that a UI element which they intend to touch comes to rest in a region of the touchscreen which is easily accessible when the scrolled object has come to rest. For instance, if scrolling a newspaper web page, the user may release the scrolled web page when a link to an article which she considers interesting becomes visible at the bottom of touchscreen 110. Once the scrolled web page comes to rest, the link, e.g., link 122, is displayed in a region 130 of touchscreen 110 which is easy to access, and the user may request the linked article by touching the link. Embodiments of the invention, such as device 100, are advantageous in that the linked article, and optionally other content which can be requested by links which come to rest in a region of touchscreen 110 having a high probability of being touched, may be pre-fetched, as is described hereinbefore.

Optionally, processing means 111 may further be operative to determine the one or more UI elements which the user of device 100 is likely to touch in response to detecting a characteristic motion of device 100, a characteristic change in orientation of device 100, or both. This is a motion and/or change in orientation of device 100 which occurs when the user extends her thumb 151 to reach regions of touchscreen 110 which are more difficult to access, thereby effectively modifying the touch pattern. For the purpose of detecting a motion and/or change in orientation of device 100, the device is optionally provided with sensors 112 which are suitable for detecting the device's motion, change in orientation, or both, such as accelerometers or gyroscopes. By detecting a motion and/or change in orientation of device 100 just before the user touches touchscreen 110, an association between a certain motion and/or change in orientation, characterized by, e.g., a certain displacement, acceleration, or tilt, of device 100, and a specific touch pattern can be derived and stored for future use. In this way, a touch pattern which is dependent on the characteristic motion and/or characteristic change in orientation of device 100 is obtained. Such touch patterns are advantageous in that they provide more accurate predictions of which UI elements the user is likely to touch. This is the case since users may extend their thumb to reach certain regions of touchscreen 110 which are difficult to reach. These regions are rather small, as compared to region 130 of touchscreen 110 which is accessible without extending thumb 151. Accordingly, the most likely UI element can be determined with improved accuracy in response to detecting a characteristic motion and/or a characteristic change in orientation of device 100.

Figure 2:
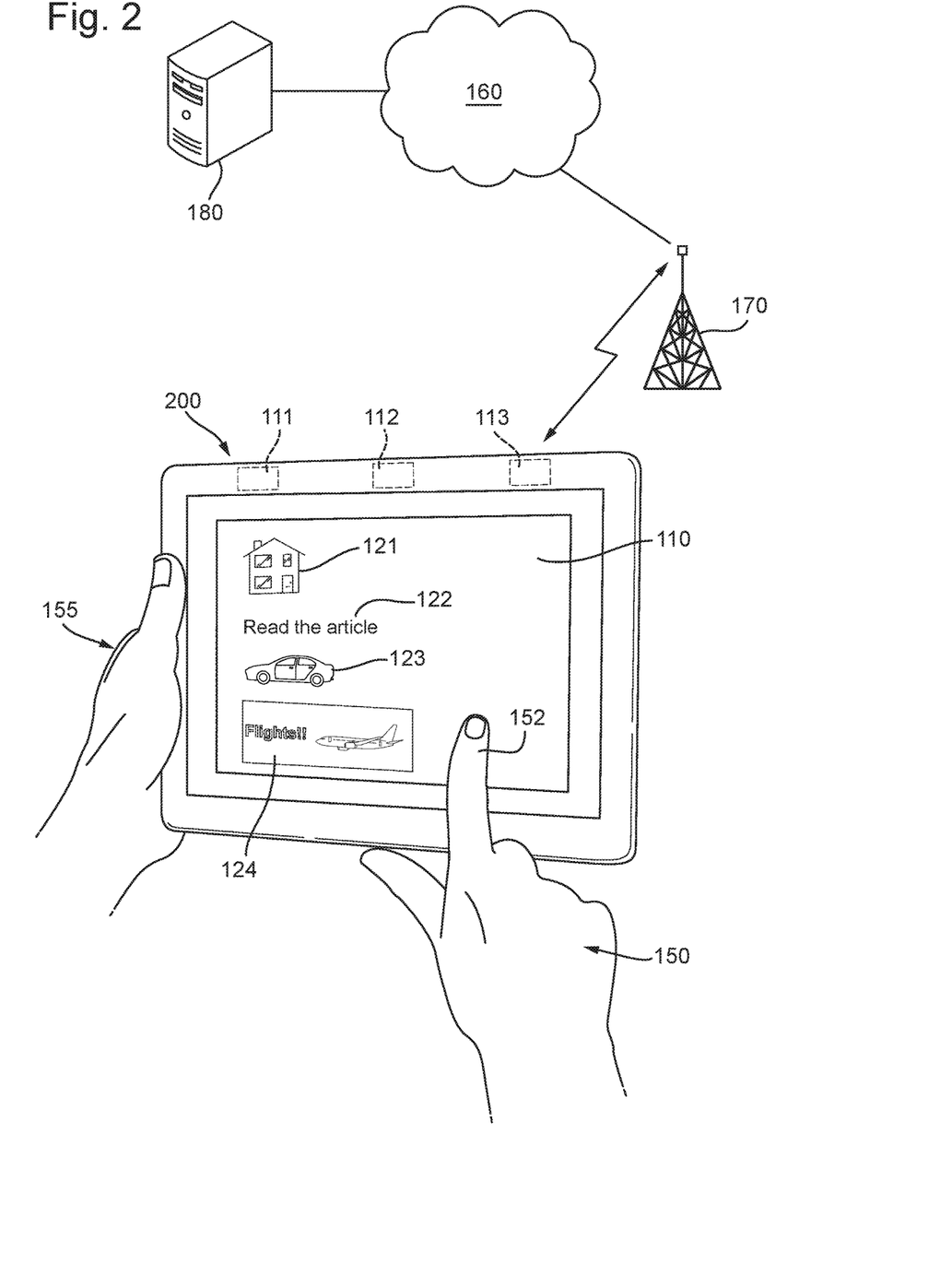
FIG. 2 shows a device for handheld operation, in accordance with another embodiment of the invention.

It will be appreciated by those skilled in the art that, while device 100 in FIG. 1 is illustrated as being designed to be operated by one hand 150 of the user of device 100, embodiments of the invention are not limited to single-handed operation. Rather, depending on the geometry of an embodiment of the device for handheld operation, it may be operable by one hand, i.e., single-handedly, or with both hands. For the sake of illustrating operation with both hands 150 and 155 of a user, an alternative embodiment 200 of the device for handheld operation is shown in FIG. 2. Device 200 is similar to device 100 and comprises a touchscreen 110, processing means 111, means 113 for communicating with a communications network 160, via a RAN 170, and optionally, sensors 112 for detecting a motion of device 200. Contrary to device 100, and owing to the larger size of device 200 as compared to device 100, device 200 is illustrated as being held by one hand 150 of the user whereas the user's other hand 155 interacts with touchscreen 110 using a finger of hand 155, e.g., the index finger 152. Device 200 may, e.g., be a tablet. For further details, reference is made to what has been described hereinbefore.

In the following, touch patterns are described with reference to FIG. 3, in accordance with embodiments of the invention.

Figure 3:
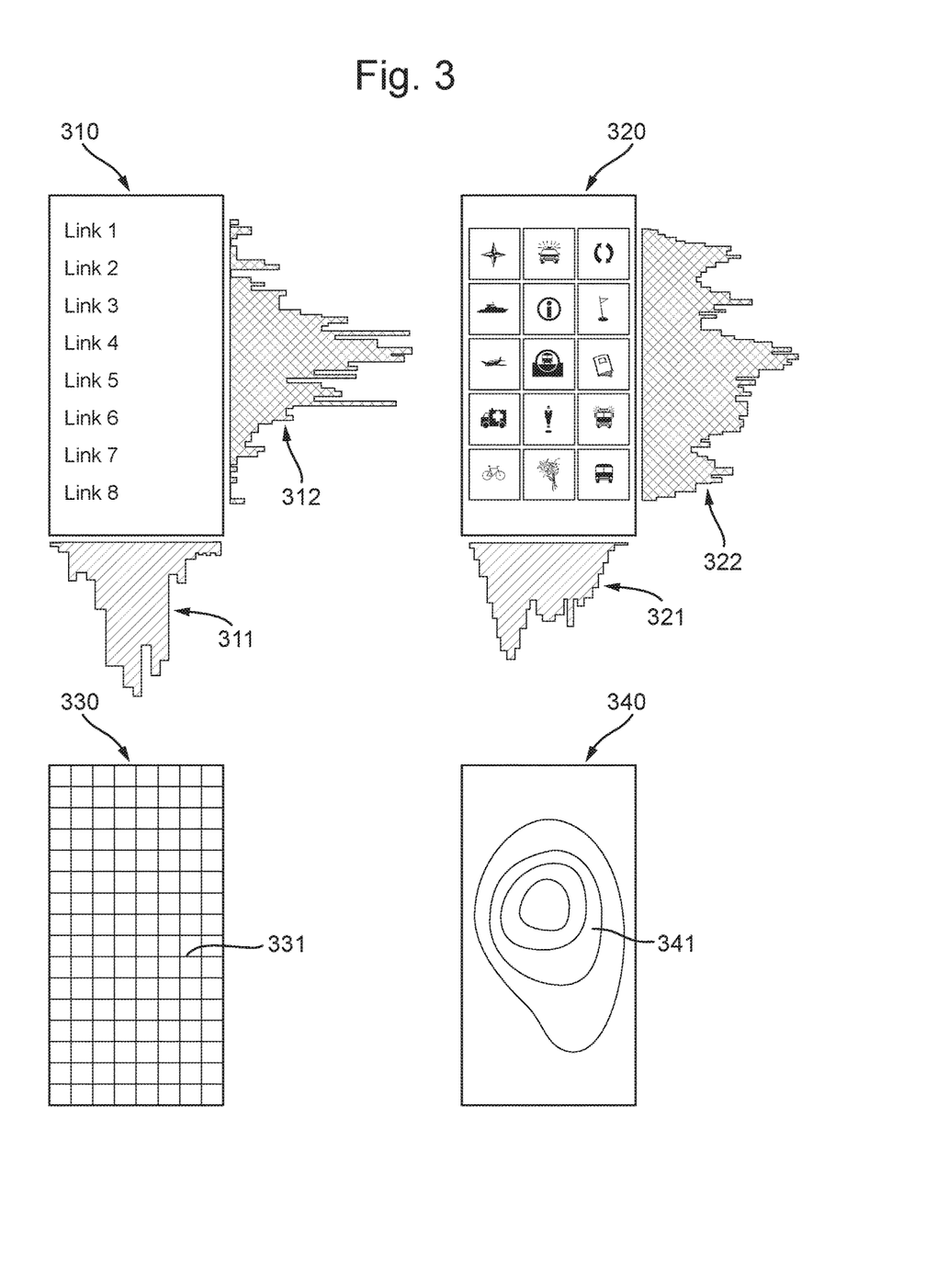
FIG. 3 illustrates touch patterns, in accordance with embodiments of the invention.

In FIG. 3, four exemplifying touch patterns are shown, in the art also known as touch heatmaps. Touch patterns reflect the relative probability that a user of a device, such as device 100 or 200, touches the device's touchscreen 110 at a certain position. Note that the touch patterns shown in FIG. 3 are illustrated as having the same aspect ratio as touchscreen 110 of device 100, but corresponding touch patterns having other aspect ratios, e.g., that of touchscreen 110 of device 200, can easily be envisaged.

Touch patterns 310 and 320 are illustrated as utilizing two histograms 311/312 and 321/322 for describing touch probability, one for each axis or side of touchscreen 110. Such touch patterns may be stored in a data storage of device 100 or 200 (e.g., as touch pattern 432 in memory 430 of processing means 111, see FIG. 4) or a data storage accessible by device 100 or 200 (e.g., a NAS or cloud storage accessible over communications network 160), using two vectors comprising probability values, one for each of the two histograms. Alternatively, as is shown for touch pattern 330, a grid 331 of, preferably equally sized regions or cells, may be assigned to touchscreen 110, and a probability value for each region may be arranged in a matrix which is stored in such data storage. In this case, the matrix containing probability values represents a two-dimensional histogram reflecting touch probability. As yet a further alternative, relative touch probability may also be stored as a contour map 341, using any suitable format known in the art, as is illustrated by touch pattern 340. It will be appreciated that touch patterns in accordance with embodiments of the invention may be stored using any other format which is suitable for describing a relative probability for a user of the device touching certain regions of the device's touchscreen.

As was described hereinbefore, the touch pattern utilized by embodiments of the invention may be user specific. This is advantageous since predictions of UI elements which the user is likely to touch take user habits as well as the anatomy of the user's hand or hands into account. Moreover, user specific touch patterns may be improved over time by updating the touch patterns based on actual user interactions with the touchscreen.

In addition to, or instead of, being user specific, the touch pattern may also be dependent on the displayed UI elements 121-124, in particular their arrangement on touchscreen 110. This is illustrated in FIG. 3, which exemplifies a touch pattern 310 for a single-columned arrangement of UI elements, such as a list of links, whereas touch pattern 320 reflects touch probability for UI elements arranged in a grid, such as a collection of images or icons.

Embodiments of the invention may also utilize touch patterns which are user specific in combination with being dependent on the displayed UI elements, and/or being dependent on a characteristic motion of the device, and/or being dependent on a characteristic change in orientation of the device.

It will further be appreciated that touch patterns may be shared between different devices, in particular different devices of the same user. This is advantageous in that a touch pattern which the user has trained on one device can be used for predicting the most likely UI elements, in accordance with embodiments of the invention, on another device. The different devices may be of the same or different types, and may comprise touchscreens of the same, similar, or different, size and aspect ratio. Sharing of touch patterns between devices may be achieved by storing data describing the touch pattern, such as vectors, matrices, or contour maps, on a network data storage rather than, or in addition to, in a data storage of the device. The network data storage may, e.g., be a NAS or a cloud storage which the devices are operative to access via communications network 160 (not shown in FIGS. 1 and 2, but similar to server 180).

Embodiments of the invention may comprise different means for implementing the features described hereinbefore, and these features may in some cases be implemented according to a number of alternatives. For instance, displaying UI elements may, e.g., be performed by processing means 111, presumably executing an operating system of device 100 or 200, in cooperation with touchscreen 110. With respect to sharing touch patterns between several devices, as is described hereinbefore, it will be appreciated that at least parts of the functionality described throughout this disclosure may be performed on a network computing resource, e.g., a server which is accessible for the different devices through communications network 160 (not shown in FIGS. 1 and 2, but similar to server 180). More specifically, updating the touch pattern based on a position of the touched UI element may be performed at such server, rather than device 100 or 200, in response to device 100 or 200 detecting that the user touches one of the displayed UI elements. In this case, information pertaining to the touched UI element is sent from device 100 or 200 to the server, which updates the touch pattern in response to receiving information pertaining to the touched UI elements. The server provides updated touch patterns to the different devices, either by pushing updated touch patterns or on request by one of the devices. It will also be appreciated that maintaining and updating touch patterns may be provided as a cloud service.

Figure 4:
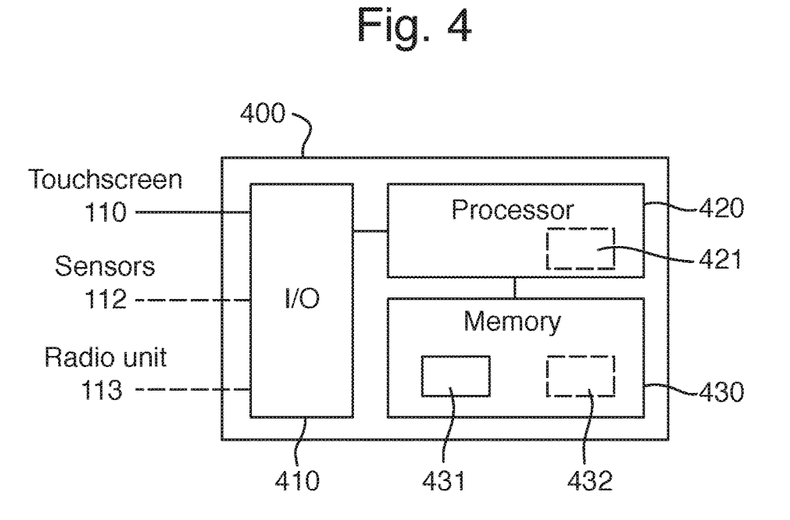
FIG. 4 shows a processing unit of a device for handheld operation, in accordance with an embodiment of the invention.

In FIG. 4, an embodiment 400 of processing means 111 is shown. Processing means 400 comprises a processor 420, e.g., a general purpose processor, a memory 430 containing instructions 431, i.e., a computer program, and one or more interfaces 410 ("I/O" in FIG. 4) operative to receive information from, and control, touchscreen 110, and, optionally, sensors 112 and/or radio unit 113. Computer program 431 is executable by processor 420, whereby device 100 or 200 is operative to perform in accordance with embodiments of the invention, as described hereinbefore with reference to FIGS. 1 to 3. Processing means 400 may further be operative to store one or more touch patterns 432 in memory 430, and optionally update stored touch patterns 432, as was described hereinbefore. Also shown in FIG. 4 is a cache memory 421 which processor 420 is provided with. Cache memory 421 has a shorter access time than memory 430. In an embodiment of the invention, computer-executable instructions 431 stored in memory 430 are, at least partially, loaded into cache memory 421, if a UI element which computer-executable instructions 431 are associated with is determined likely to be touched by the user of device 100 or 200.

Figure 5:
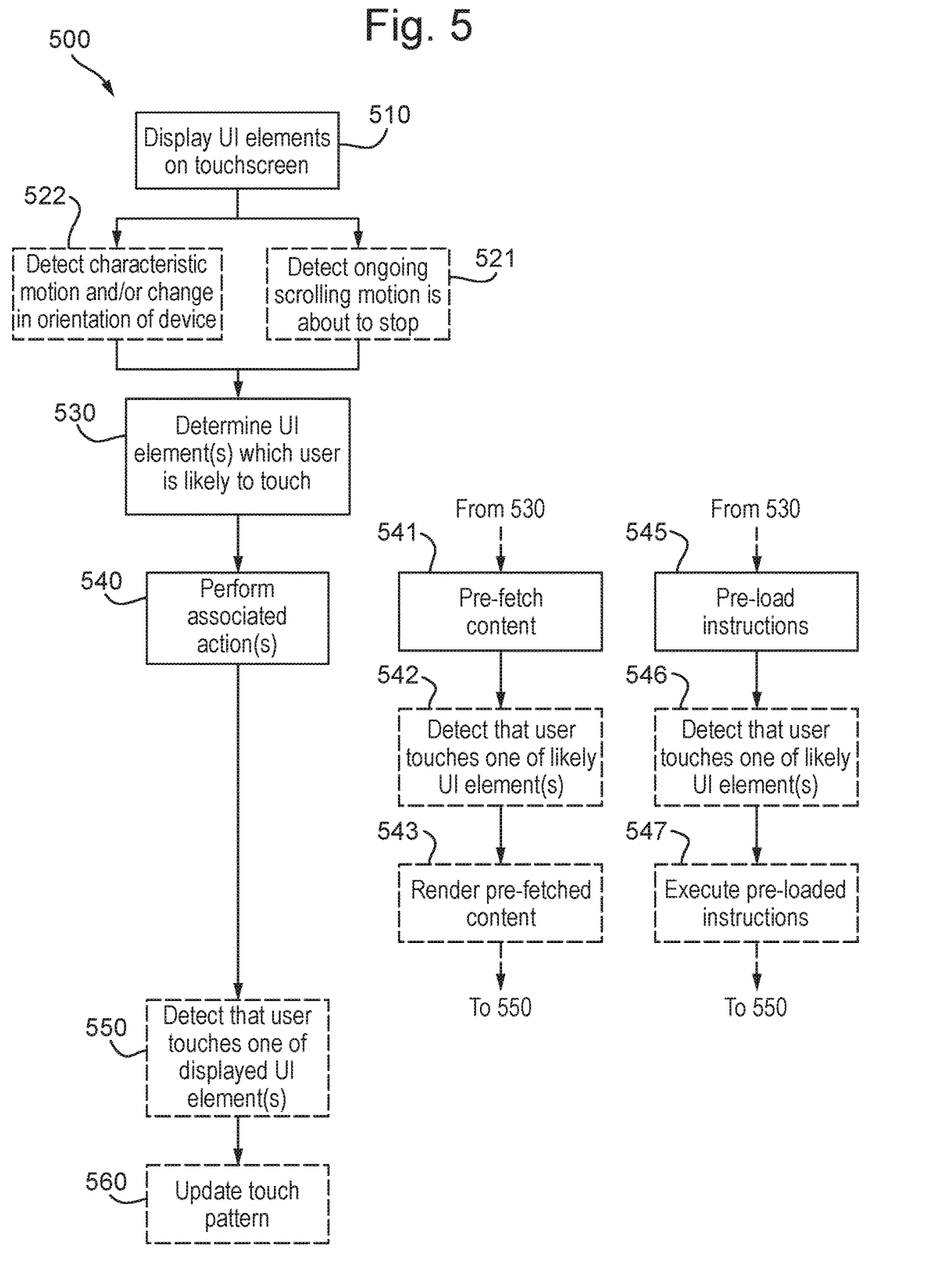
FIG. 5 shows a method of a device for handheld operation, in accordance with an embodiment of the invention.

In FIG. 5, a flowchart illustrating an embodiment 500 of the method of a device for handheld operation, such as device 100 or 200, is shown. Method 500 comprises displaying 510 a plurality of UI elements on a touchscreen of the device, wherein each of the displayed UI elements is associated with an action which is performed in response to touching the UI element. Method 500 further comprises determining 530, based on a touch pattern, one or more of the displayed UI elements which a user of the device is likely to touch, and performing 540, for at least one of the one or more UI elements which the user of the device is likely to touch, the action associated with the UI element. The touch pattern may optionally be user specific and/or dependent on the displayed UI elements, in particular the arrangement of the displayed UI elements on the touchscreen of the device.

For instance, the action may comprise requesting 541, i.e., pre-fetching, content provided by a server via a communications network which the device is operative to access. Optionally, the content may be identified by a network address associated with the UI element, such as a URL. Further optionally, method 500 may comprise detecting 542 that the user touches one of the one or more UI elements which the user of the device is likely to touch, and rendering 543 the requested content which is associated with the touched UI element.

As an alternative, the action may comprise loading 545 computer-executable instructions stored in a first memory comprised in the device into a second memory comprised in the device, wherein the second memory has a shorter access time than the first memory. The second memory may, e.g., comprise a cache memory. Optionally, method 500 may further comprise detecting 546 that the user touches one of the one or more UI elements which the user of the device is likely to touch, and executing 547 the loaded computer-executable instructions which are associated with the touched UI element.

Optionally, method 500 may further comprise detecting 550 that the user touches one of the displayed UI elements, and updating 560 the touch pattern based on a position of the touched UI element.

Further optionally, the one or more UI elements which the user of the device is likely to touch may be determined 530 in response to detecting 521 that an ongoing scrolling motion is about to stop. In this case, the one or more UI elements which the user of the device is likely to touch may be determined 530 based on respective positions where the displayed UI elements come to rest when the scrolling motion has stopped.

Alternatively, the one or more UI elements which the user of the device is likely to touch may be determined 530 in response to detecting 522 a characteristic motion of the device, a characteristic change in orientation of the device, or both. Optionally, the touch pattern may be dependent on the characteristic motion, the characteristic change in orientation, or both.

It will be appreciated that method 500 may comprise additional or modified steps in accordance with what is described hereinbefore. An embodiment of method 500 may be implemented as software, such as computer program 431, to be executed by a processor comprised in the device (such as processor 420 described with reference to FIG. 4), whereby the device is operative to perform in accordance with embodiments of the invention.

Figure 6:
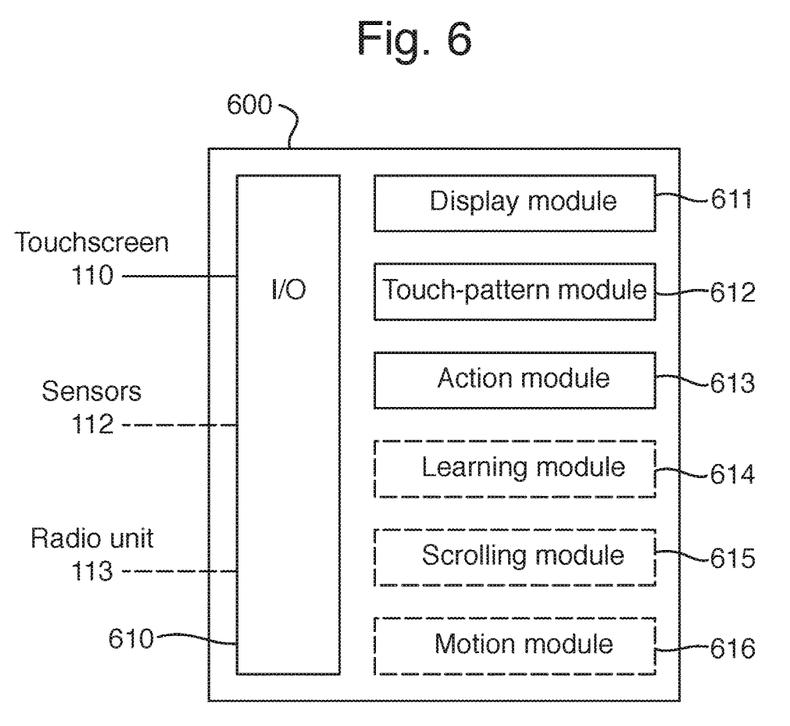
FIG. 6 shows a processing unit of a device for handheld operation, in accordance with another embodiment of the invention.

In FIG. 6, an alternative embodiment 600 of processing means 111 is shown. Processing means 600 comprises one or more interface modules 610 ("I/O" in FIG. 6) operative to receive information from, and control, touchscreen 110, and, optionally, sensors 112 and/or radio unit 113. Processing means 600 further comprises a display module 611 operative to display a plurality of UI elements on touchscreen 110, a touch-pattern module 612 operative to determine, based on a touch pattern, one or more of the displayed UI elements which a user of the device is likely to touch, and an action module 613 operative to perform, for at least one of the one or more UI elements which the user of the device is likely to touch, the action associated with the UI element. The touch pattern may optionally be user specific and/or dependent on the displayed UI elements, in particular the arrangement of the displayed UI elements on the touchscreen of the device.

For instance, action module 613 may be operative to request, i.e., pre-fetch, content provided by a server via a communications network which the device is operative to access. Optionally, the content may be identified by a network address associated with the UI element, such as a URL. Further optionally, action module 613 may be operative to detect that the user touches one of the one or more UI elements which the user of the device is likely to touch, and render the requested content which is associated with the touched UI element.

As an alternative, action module 613 may be operative to load computer-executable instructions stored in a first memory comprised in the device into a second memory comprised in the device, wherein the second memory has a shorter access time than the first memory. The second memory may, e.g., comprise a cache memory. Optionally, action module 613 may further be operative to detect that the user touches one of the one or more UI elements which the user of the device is likely to touch, and execute the loaded computer-executable instructions which are associated with the touched UI element.

Processing means 600 may comprise additional modules for implementing additional or modified features in accordance with embodiments of the invention, as is described hereinbefore. For instance, processing means 600 may comprise a learning module 614 which is operative to update the touch pattern in response to detecting that the user touches one of the displayed UI elements, and based on a position of the touched UI element.

As a further example, processing means 600 may comprise a scrolling module 615 which is operative to detect that an ongoing scrolling motion is about to stop. Accordingly, the touch-pattern module 612 may optionally be operative to determine the one or more UI elements which the user of the device is likely to touch in response to detecting that an ongoing scrolling motion is about to stop. The touch-pattern module 612 may further be operative to determine the one or more UI elements which the user of the device is likely to touch based on respective positions where the displayed UI elements come to rest when the scrolling motion has stopped.

As a yet a further example, processing means 600 may comprise a motion module 616 which is operative to determine, based on information received from sensors 113, the one or more UI elements which the user of the device is likely to touch in response to detecting a characteristic motion of the device, a characteristic change in orientation of the device, or both. Optionally, the touch pattern may be dependent on the characteristic motion, the characteristic change in orientation, or both.

It will be appreciated that modules 611-616, and any additional modules comprised in processing means 600, may be implemented by any kind of electronic circuitry, e.g., any one or a combination of analogue electronic circuitry, digital electronic circuitry, and processing means executing a suitable computer program.

The person skilled in the art realizes that the invention by no means is limited to the embodiments described above. On the contrary, many modifications and variations are possible within the scope of the appended claims.

The invention claimed is:

1. A device for handheld operation, the device comprising:
   a touchscreen;
   a processor; and
   a memory, wherein said memory contains instructions, which when executed by said processor cause the device to:
   detect that an ongoing scrolling motion is about to stop;
   in response to detecting that the ongoing scrolling motion is about to stop, determine one or more displayed user interface (UI) elements which a user of the device is likely to touch, wherein each one of the one or more displayed UI elements is associated with an action which is performed in response to the user touching the UI element, and further wherein the determination of the one or more displayed UI elements which the user of the device is likely to touch is based on: i) a touch pattern stored in a data storage of the device or in a data storage accessible to the device over a communications network and reflecting a relative probability that a user touches a specific position on, or region of, the touch screen, and ii) respective positions where the one or more displayed UI elements will come to rest when the scrolling motion has stopped, and
   perform, for at least one of the one or more UI elements which the user of the device is likely to touch, the action associated with the at least one of the one or more UI elements.

2. The device of claim 1, wherein the touch pattern is user specific and/or dependent on the displayed UI elements.

3. The device of claim 1, wherein the action comprises requesting content provided by a server via a communications network which the device is operative to access.

4. The device of claim 3, being further caused to:
   detect that the user touches one of the one or more UI elements which the user of the device is likely to touch, and render the requested content which is associated with the touched UI element.

5. The device of claim 1, wherein the action comprises loading computer-executable instructions stored in a first memory of the device into a second memory of the device, wherein the second memory has a shorter access time than the first memory.

6. The device of claim 5, wherein the second memory comprises a cache memory.

7. The device of claim 5, wherein the device is further caused to:
detect that the user touches one of the one or more UI elements which the user of the device is likely to touch, and
execute the loaded computer-executable instructions which are associated with the touched UI element.

8. The device of claim 1, being further caused to:
detect that the user touches one of the displayed UI elements, and
update the touch pattern based on a position of the touched UI element.

9. The device of claim 1, wherein the device is configured for single-handed operation.

10. The device of claim 1, wherein the device is one of a mobile terminal, a smartphone, and tablet.

11. A method of a device for handheld operation, the device comprising a touchscreen, the method comprising:
detecting that an ongoing scrolling motion is about to stop;
in response to detecting that the ongoing scrolling motion is about to stop, determining one or more displayed user interface (UI) elements which a user of the device is likely to touch, wherein each one of the one or more displayed UI elements is associated with an action which is performed in response to the user touching the UI element, and further wherein the determination is based on: i) a touch pattern stored in a data storage of the device or in a data storage accessible to the device over a communications network and reflecting a relative probability that a user touches a specific position on, or region of, the touch screen and ii) respective positions where the one or more displayed UI elements will come to rest when the scrolling motion has stopped; and
performing, for at least one of the one or more UI elements which the user of the device is likely to touch, the action associated with the at least one of the one or more UI elements.

12. The method of claim 11, wherein the touch pattern is user specific.

13. The method of claim 11, wherein the touch pattern is dependent on the displayed UI elements.

14. The method of claim 11, wherein the action comprises requesting content provided by a server via a communications network which the device is operative to access.

15. The method of claim 14, further comprising:
detecting that the user touches one of the one or more UI elements which the user of the device is likely to touch, and
rendering the requested content which is associated with the touched UI element.

16. The method of claim 11, wherein the action comprises loading computer-executable instructions stored in a first memory comprised in the device into a second memory comprised in the device, wherein the second memory has a shorter access time than the first memory.

17. The method of claim 16, further comprising:
detecting that the user touches one of the one or more UI elements which the user of the device is likely to touch, and
executing the loaded computer-executable instructions which are associated with the touched UI element.

18. A computer program product comprising a non-transitory computer readable medium storing computer-executable instructions for causing a device to perform the method of claim 11.

19. A method of a device for handheld operation, the device comprising a touchscreen, the method comprising:
detecting i) a particular change in orientation of the device or ii) a particular motion of the device;
in response to detecting i) the particular change in orientation of the device or ii) the particular motion of the device, determining one or more displayed user interface (UI) elements which a user of the device is likely to touch, wherein each one of the one or more displayed UI elements is associated with an action which is performed in response to the user touching the UI element, and further wherein the determination of the one or more displayed UI elements which the user of the device is likely to touch is based on a touch pattern that indicates at least: i) a first probability that a user touches a first position on, or first region of, the touchscreen and ii) a second probability that a user touches a second position on, or second region of, the touchscreen; and
performing, for at least one of the one or more UI elements which the user of the device is likely to touch, the action associated with the at least one of the one or more UI elements.

20. The method of claim 19, wherein the touch pattern comprises:
a first set of probability values including a first probability value (P1) and second probability value (P2), wherein P1 indicates a probability that the user touches any region of the touchscreen included within a first set of touchscreen regions, and P2 indicates a probability that the user touches any region of the touchscreen included within a second set of touchscreen regions;
a second set of probability values including a third probability value (P3) and a fourth probability value (P4), wherein P3 indicates a probability that the user touches any region of the touchscreen included within a third set of touchscreen regions, and P4 indicates a probability that the user touches any region of the touchscreen included within a fourth set of touchscreen regions, wherein
the first set of touchscreen regions and the second set of touchscreen regions are disjoint,
the third set of touchscreen regions and the fourth set of touchscreen regions are disjoint,
a first touchscreen region included in the first set of touchscreen regions is also included in the third set of touchscreen regions, but not other touchscreen region included in the first set of touchscreen regions is also included in third set of touchscreen regions, and
a second touchscreen region included in the first set of touchscreen regions is also included in the fourth set of touchscreen regions, but not other touchscreen region included in the first set of touchscreen regions is also included in fourth set of touchscreen regions.

21. The method of claim 19, wherein the touchscreen is divided in to at least a first set of regions, the first set of regions comprising a least four regions, the touch pattern comprises a set of probability (P) values, each P value corresponding to a different one of the regions included in the set of regions and each P value indicating a probability that user will touch the region to which the P value corresponds.

22. The method of claim 14, further comprising receiving the requested content; and storing the requested content in a cache.

\* \* \* \* \*

UNITED STATES PATENT AND TRADEMARK OFFICE
CERTIFICATE OF CORRECTION

PATENT NO. : 10,691,170 B2  
APPLICATION NO. : 15/557572  
DATED : June 23, 2020  
INVENTOR(S) : Okvist et al.

Page 1 of 1

It is certified that error appears in the above-identified patent and that said Letters Patent is hereby corrected as shown below:

On the Title Page

In Item (57), under "ABSTRACT", in Column 2, Line 8, delete "touch pattern (130)," and insert -- touch pattern, --, therefor.

In the Specification

In Column 14, Line 12, delete "sensors 113," and insert -- sensors 112, --, therefor.

In the Claims

In Column 14, Lines 51-52, in Claim 1, delete "touch screen," and insert -- touchscreen, --, therefor.

In Column 15, Line 42, in Claim 11, delete "touch screen and" and insert -- touchscreen, and --, therefor.

In Column 16, Line 28, in Claim 19, delete "touchscreen and" and insert -- touchscreen, and --, therefor.

In Column 17, Line 10, in Claim 22, delete "comprising" and insert -- comprising: --, therefor.

Signed and Sealed this  
Twenty-second Day of September, 2020

Andrei Iancu  
*Director of the United States Patent and Trademark Office*